INVENTOR.
Bela A. Silard
BY
Michael S. Striker
Agt.

INVENTOR.
Bela A. Silard
BY Michael S. Striker
agt.

INVENTOR.
Bela A. Silard
BY Michael S. Striker

INVENTOR.
Bela A. Silard
BY Michael S. Striker
ag.

July 2, 1963  B. A. SILARD  3,096,137
RECORDER FOR DENSITOMETER
Filed April 3, 1957  6 Sheets-Sheet 6

INVENTOR.
Bela A. Silard
BY Michael S. Striker

United States Patent Office 3,096,137
Patented July 2, 1963

3,096,137
RECORDER FOR DENSITOMETER
Bela A. Silard, 300 Washington Ave., Pleasantville, N.Y.
Filed Apr. 3, 1957, Ser. No. 650,372
11 Claims. (Cl. 346—32)

The present invention relates to new and improved apparatus for the quantitative analysis of separated substances. More particularly, the present invention relates to new and improved apparatus for evaluating a quantity of substances separated by migration in filter paper or the like.

In order to achieve accurate quantitative analysis of substances which have been separated on filter paper from mixtures it is necessary to have apparatus which is capable of providing absorptiometric results which are proportional to the quantity of the substance analyzed located at the various points of measurement. In order to determine the concentration of substances separated by migration in filter paper, it is advantageous to use radiation in the visible light spectrum and to use a photoelectric photometer. The photometer measures the light transmitted by the separated substances.

It is also possible to use radiation in the ultraviolet and infra-red regions as well as different types of radiation such as X-rays, fluorescence, luminescence and other types including radioactive radiation. The different types of radiation can be either transmitted, reflected or emitted by the substances.

In using such photometric devices it is necessary to analyze the large amount of data obtained. It is apparent that if a great deal of time must be lost in evaluating the output of the photometric devices, the value of such evaluation is substantially decreased.

The apparatus incorporating the principles of the present invention permits accurate evaluation of the data obtained with the photometric devices by quickly and accurately indicating the relative concentrations of the substances separated by migration on the filter paper.

It is accordingly an object of the present invention to provide a new and improved apparatus for quickly and accurately deriving and indicating the relative concentrations of substances separated in different zones of filter paper by migration.

A second object of the present invention is to provide a new and improved scanning apparatus for accurately indicating the actual distribution of substances separated by migration along a strip of filter paper.

Another object of the present invention is to obtain measuring data which are proportional to the quantity of the substances being analyzed.

A further object of the present invention is to provide a new and improved recording apparatus for recording the data corresponding to the accurate distribution of the concentration of the substances along a strip of filter paper.

Still another object of the present invention is to provide a new and improved apparatus for deriving measuring data which are proportional to the respective concentrations of substances separated by migration along filter paper, such measuring data being derived from photometric measurement data which are not proportional to the concentration.

It is still another object of the present invention to provide a new and improved scanning apparatus which provides a graphical representation that is synchronized with the movement of the filter strip containing the substances being analyzed.

With the above objects in view, the present invention mainly consists of an apparatus for quantitatively analyzing concentrations of substances separated on filter paper or the like and including means for subjecting the substances on the filter paper to a preselected radiation, means for detecting at least a portion of the radiation to which the substances have been subjected, means for producing a signal substantially proportional to the amount of the detected radiation, and means for indicating a predetermined variable, non-linear function of such signal.

In a preferred embodiment of the present invention indicating means are used which have a selected response to the signal produced and means are provided for varying the selected response of the indicating means whenever desired.

In another preferred embodiment of the present invention, an indicating apparatus for electrical signals is provided which includes input means adapted to have the electrical signals applied thereto, indicating means for indicating at least one selected non-linear function of the electrical signals, control means connected in circuit with the indicating means for controlling the response of the indicating means so that the same indicates values proportional to the selected non-linear function of the electrical signals, and response changing means connected in circuit between the control means and the input means for changing the response of the indicating means in a preselected manner so that the values indicated by the indicating means vary with respect to the selected non-linear function of the signals in the preselected manner.

For recording apparatus, a self-balancing potentiometer having a recording pen is utilized. The self-balancing potentiometer is connected in circuit with a group of variable resistance or impedance means for changing the response of the self-balancing potentiometer so that the excursion of the recording pen is no longer linear or proportional to the applied input signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1, including sub-FIGS.1(a)–1(d), is a diagrammatic representation of substances separated on filter paper together with various graphical representations for displaying the concentration of the separated substances;

FIG. 2, including sub-FIGS. 2(a)–2(d), is a diagrammatic representation of an apparatus for manually plotting the indicated output results of a photometer used for measuring the concentration of the separated substances. In addition, in FIGS. 2(b)–2(d), different embodiments of non-uniform scales are indicated;

Figure 6A:
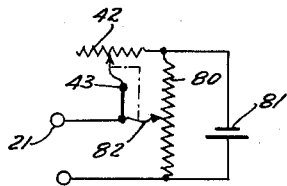
Figure 6B:
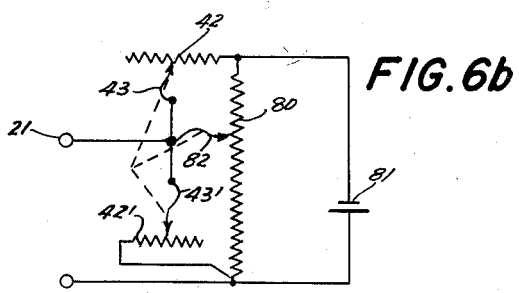
Figure 5:
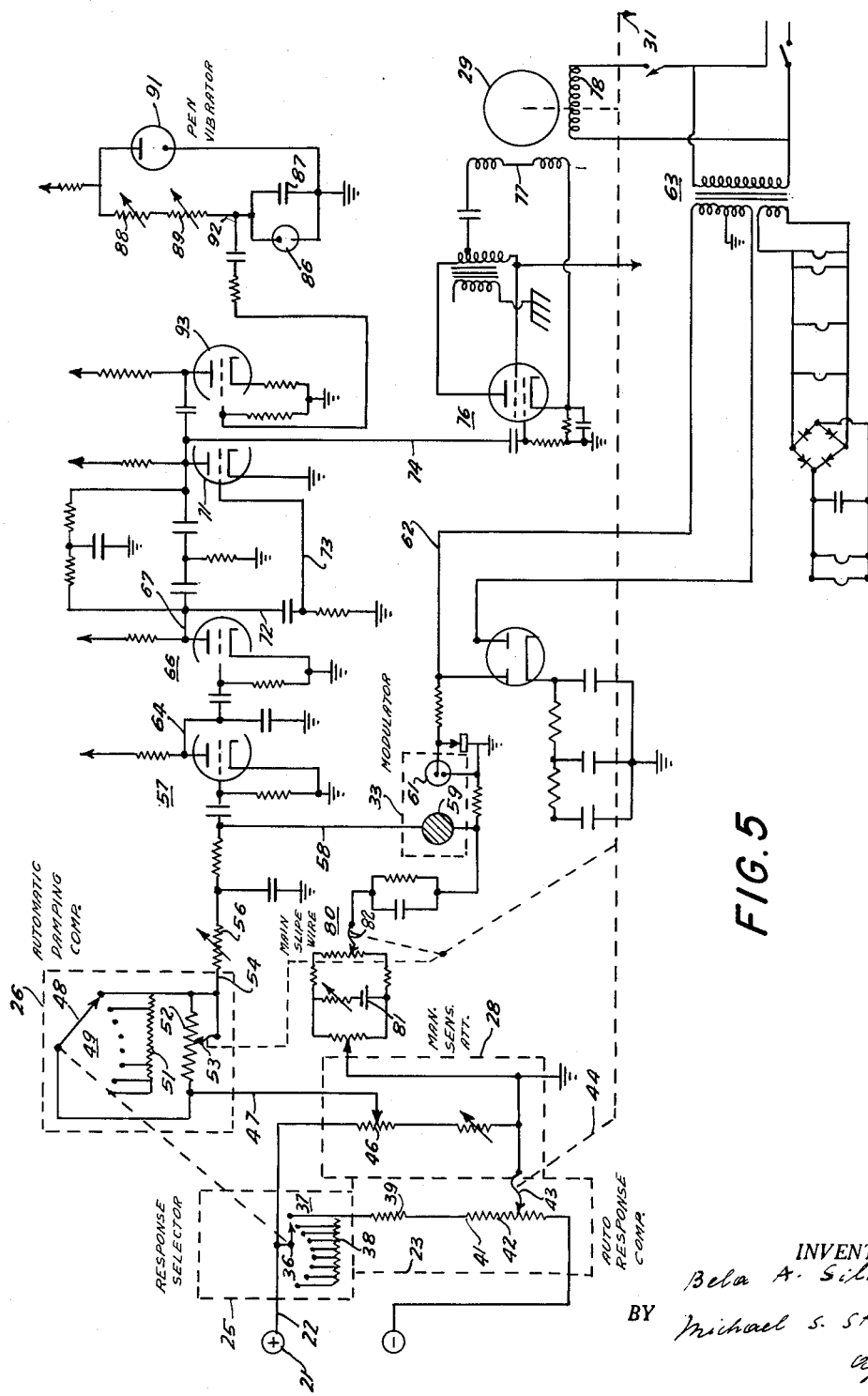
FIG. 5 is an electrical schematic diagram of the embodiment illustrated in FIG. 3.
Figure 6C:
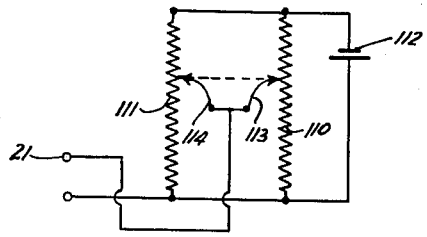
Figure 6D:
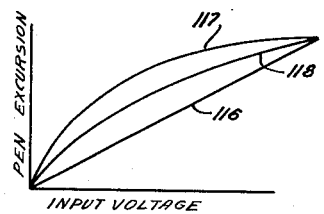
Figure 7A:
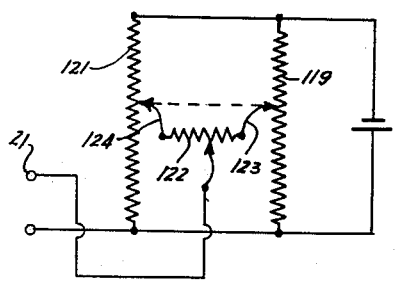
Figure 7B:
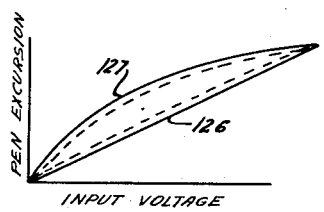
Figure 8A:
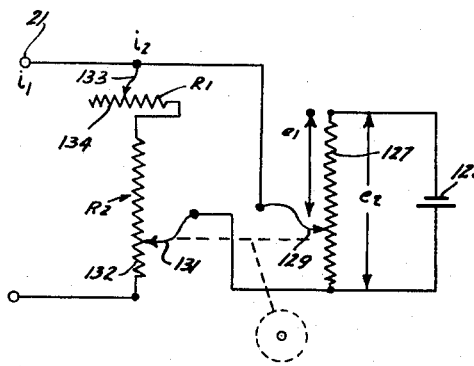
Figure 8B:
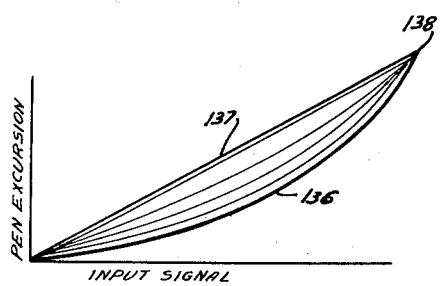
Figure 9A:
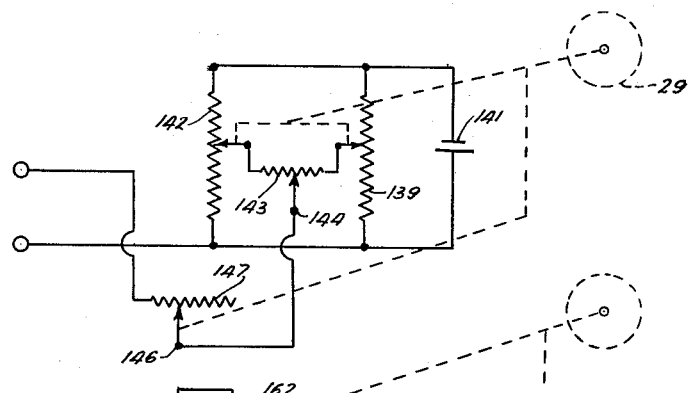
Figure 9B:
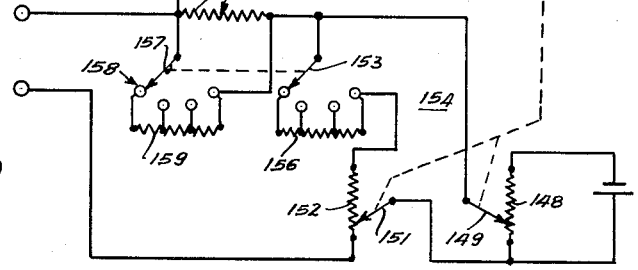
Figure 11:
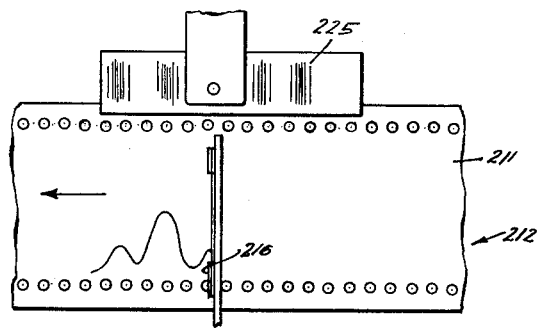
Figure 12:
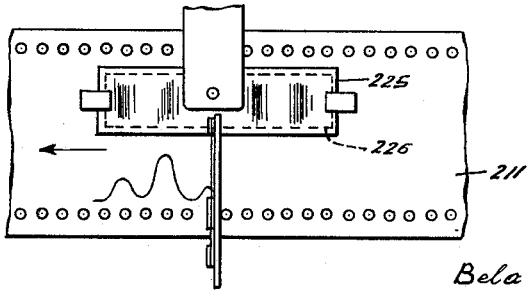
Figure 13:
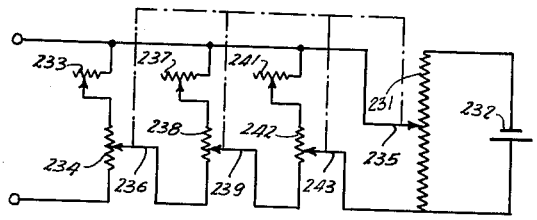
Figure 10:
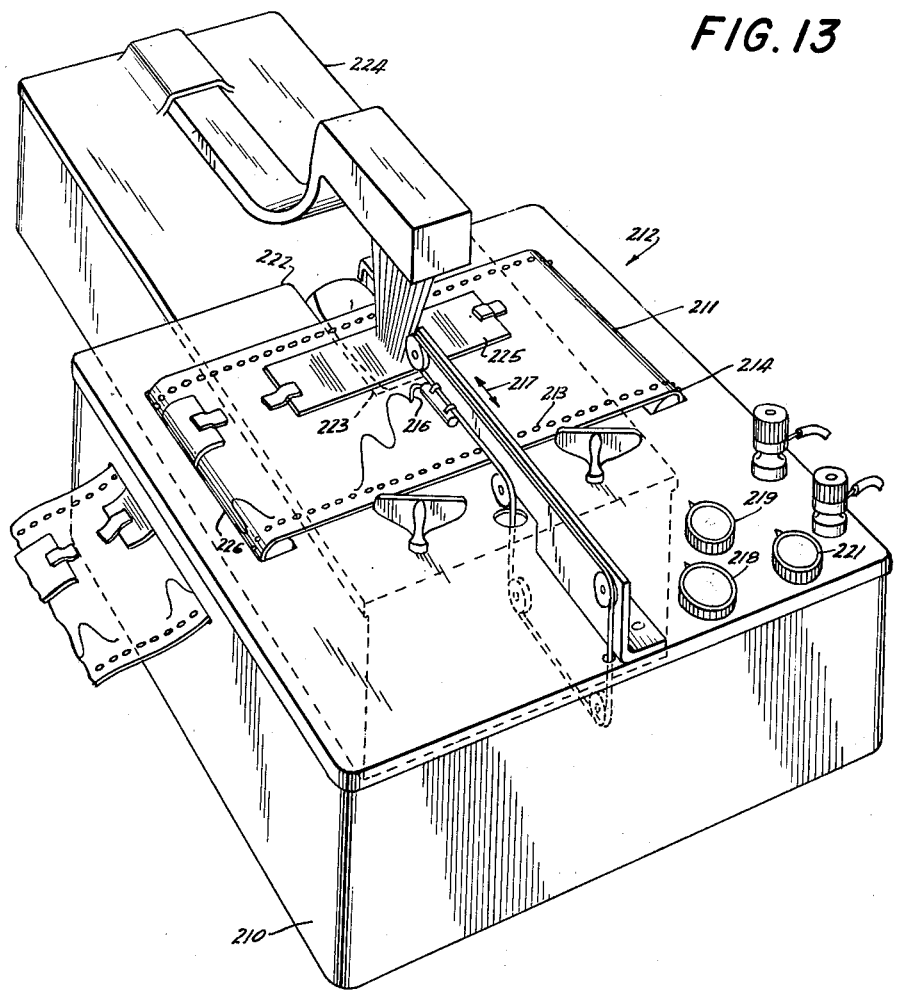

FIG. 6 including sub-FIGS. 6(a)–6(c), is an electrical schematic diagram of different embodiments of response varying members for use with the apparatus of FIG. 5 and sub-FIG. 6(d) is a graphical representation of the response obtainable with the arrangements of FIGS. 6(a)–6(c);

FIGS. 7(a) and 7(b) are respectively an electrical schematic diagram of a variable resistance arrangement for use with the recorder of the present invention and a graphical representation of the response obtainable with such an arrangement;

FIGS. 8(a) and 8(b) are respectively an electrical schematic diagram of another embodiment of the present invention together with the graphical representation of the obtainable response;

FIGS. 9(a) and 9(b) are electrical schematic diagrams of additional embodiments of the present invention;

FIG. 10 is a perspective view of the recorder apparatus shown in conjunction with a conventional densitometer;

FIG. 11 is a plan view of the chart paper in the recorder and the filter paper being scanned in the densitometer;

FIG. 12 is a plan view of a different arrangement of the filter paper and chart paper used with the present invention; and FIG. 13 is an electrical schematic diagram of another embodiment of the present invention.

Referring to the drawings and more particularly to FIG. 1, including sub-FIGS. 1(a)–1(d), a strip of filter paper 1 is shown on which have been separated three different substances by selective migration. The portions of the filter paper which carry the higher concentrations of the substances are indicated by closer shading lines 2 while the blank areas 3 indicate portions of the filter paper on which none of the substances is located.

In order to quantitatively analyze the substances separated on the filter paper by migration, a number of different techniques have been developed. Among these, the most advantageous is the evaluation of the concentration of the separated substances by means of integration, over the entire area of each zone containing a substance, of the concentration of the substance at each point thereof. In such an arrangement the curve of the concentration values plotted against a straight base line is integrated while traversing each of the various zones of the filter paper from one end thereof to the other.

The photometric data obtained by light measurement at each point obviously does not represent directly the concentration of the separated substances. The photometers that are used to obtain the optical evaluation respond to the amount of light transmitted through or reflected from the filter paper and the substances carried thereby. That is, if the source of radiation such as a light source is on one side of the filter paper and the photometer on the other side, the light transmitted through the substance on the filter paper is measured by the photometer. If the light source and the photometer are on the same side, then the light reflected from the substance on the filter paper is measured. It is clear that the more highly concentrated substance will attenuate the transmitted or reflected light to a larger degree and accordingly less of the light rays will reach the photometer.

The output of the photoelectric photometer will therefore be greater when less of the light is attenuated and will be larger for a lower concentration of the substance separated on the filter paper. Thus, the concentration of the substances on the various points of the filter paper is in reverse relationship to the amount of light transmitted or reflected at the respective points corresponding to the substances. This is true since a greater amount of the substance will bind a greater amount of the dye used in the developing process and the greater the amount of dye the more the transmission or reflection of the light will be reduced.

In an ideal situation, the relationship which is obtained between the measured light and the concentration of the substance approaches the relationship normally encountered when dyes are dissolved in liquids. This is a reverse logarithmic relationship, known as Beer's Law and defined by an equation in which the concentration is proportional to the optical density. Optical density is defined as $2 - \log T$, where $T$ is the transmittance in terms of the transmittance of the blank area of the filter paper wherein none of the dye is present.

If the above relationship would always hold true it would always be possible to use the above simple transformation function to translate the output current of the photometer into the concentration of the substances separated on the filter paper. The value or amount of the concentration is required for the ordinates of the curves. The areas under the various curves must then be evaluated for quantitative tests as indicated above.

If such a single transformation were adequate this could be permanently incorporated on the scale markings of the indicating meter used with the photometer. Similarly, in automatic recording instruments this transformation could be permanently incorporated into that part of the recorder which controls the response thereof. It is clear that the response of such an automatic recorder is the relationship between the excursion of the pen doing the recording to the input current or voltage received from the photometer. In turn, the input current or voltage received from the photometer is proportional to the light transmitted through or reflected from the substance on the filter paper. However, such a permanent transformation is not sufficient for practical purposes since it has been found that the many variations encountered when different types of dyes, reagents or filter papers are used result in considerable variation of the actual relationship between the concentration of the separated substance and the light reaching the photometer. The techniques used in dyeing, developing and drying also contribute to additional variations.

These problems are fully discussed in an article by J. R. Walsh et al. entitled "Comparative Studies In Quantitative Filter Paper Electrophoresis," The Journal of Laboratory and Chemical Medicine, volume 46; 405, November 1955, particularly pages 774, and 778.

While the relationship obtained in practice resembles the relationship wherein the optical density is exactly proportional to the concentration, the actual relationship deviates from this desired relationship in various degrees.

In view of these variations between the actual relation and the theoretical relation, it is advantageous and desirable to have apparatus which provides flexibility in the transformation of the output current or voltage of the photometer into the excursion of the pen of the recorder. Accordingly, by means of the present invention, it is possible to provide such flexibility in transformation by introducing variable response changing means between the photometer and the actual curve-plotting device or recorder.

With the present invention, therefore, the operator of the recording instrument may select the transformation based on calibration trials with the particular substances whose concentration is to be measured. For this purpose, the actual relationship necessary to obtain the transformation between the optical density and the concentration of the substances separated by migration on the filter paper is established empirically.

Figure 1A:
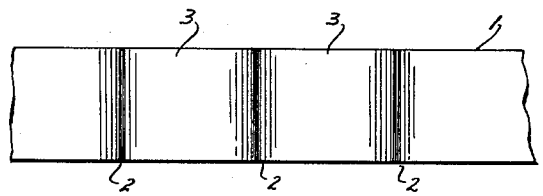

To graphically demonstrate this problem, the sub-FIGS. 1(a)–1(d) have been arranged so that a vertical line drawn through all of the graphs corresponds to the same point and to the same concentration of the substance on the filter paper 1 in FIG. 1(a).

Figure 1B:
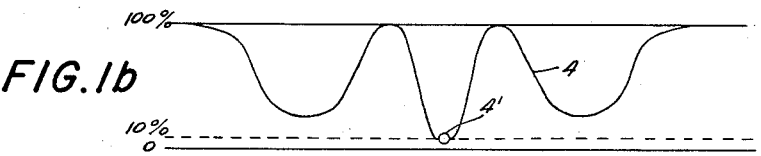

FIG. 1(b) is a graphical representation of the electrical signal output from the transmission photometer or optical densitometer of the usual linear kind wherein the output is proportional to the amount of light acting on the photometer. The points for 100% and 10% transmission are marked to show that the ratio of the ordinates of the graphical representation of FIG. 1(b) is 10 to 1. It is apparent that recording the output of such a densitometer directly by means of an ordinary automatic recorder cannot yield the proper concentration values of the corresponding substances since neither the transmitted light nor the absorbed light is proportional to the concentration of the substance separated by migration on the filter paper.

In FIG. 1(b) the point 4' on the curve 4 has been indicated to correspond to the minimum electrical signal output of the photometer. It is clear that where the photometer is scanning a blank area 3 on the filter paper, the electrical signal output from the photometer will cause the recorder to indicate at the maximum or arbitrary 100% level as shown in FIG. 1(b).

Figure 1C:
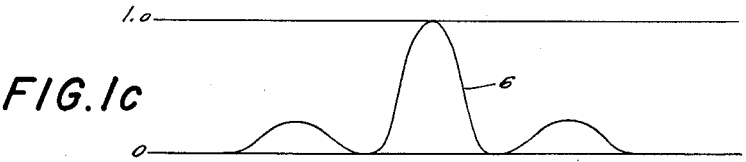

Referring now to FIG. 1(c), a reverse logarithmic function of the curve in FIG. 1(b) is shown. This function is known as the optical density. It is apparent that a translation of the recorder input into line 6 of FIG. 1(c) will yield concentration values to an approximate degree since the optical density of the light absorbing substances is known to be approximately proportional to the concentration of the substance.

Figure 1D:
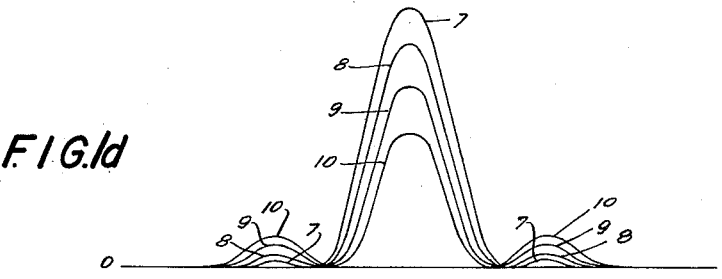

In FIG. 1(d) several different graphs 7, 8, 9 and 10 are shown in superimposed relationship as individually drawn by a recorder incorporating the principles of the present invention. For each of the graphs 7–10, a different translation function or response of the recorder was used in plotting the same electrical signal input as it was derived from the same points of the filter paper using a transmission photometer. It is apparent that the graphs 7–10 have been obtained by means of non-linear transformations.

The graph 7 which is uppermost at the center incorporates the largest amount of correction or compensation for increasing optical densities which are known to lag behind increasing chemical concentrations.

With the above study of FIGS. 1(a)–1(b), it becomes apparent that the graphs plotted by the conventional recording instruments will not provide a graphical representation which is a true indication of the actual concentration of the substances separated by migration on the filter paper.

Figure 2A:
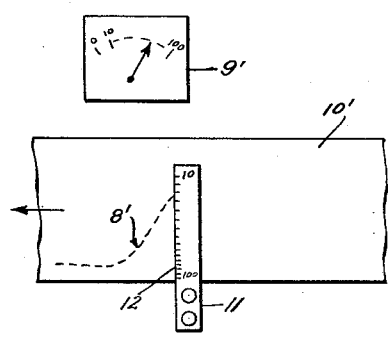

Referring now to FIG. 2(a), a simple arrangement for providing such transformations is shown. The curve 8' which indicates the concentration of the substance separated by migration on the filter paper is plotted on the chart paper 10' by means of a ruler 11. The operator of the instrument reads the output meter 9' of the photometer to determine the amount of the light received by the photometer from the substance on the filter paper. The operator then plots a point corresponding to the indicated value on the non-uniform scale 12 of the ruler 11.

The scale of the ruler 11 has previously been arranged to correspond to the empirically found transformation for the particular substance whose concentration is being measured. The graph 8' is thereby plotted point by point as the filter paper moves past the photometer to produce variations in the output signal indicated by the output meter 9' of the photometer.

Figures 2B, 2C, 2D:
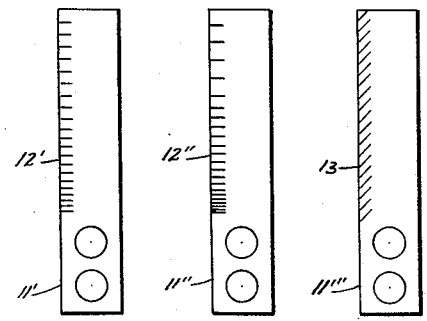

In FIGS. 2(b) and 2(c), additional rulers 11' and 11" having scales 12' and 12", respectively, are indicated. It is seen that the lower portion of the rulers 11' and 11" as well as the ruler 11 is provided with two mounting holes which are adapted to be fastened on corresponding pins in the plotting device. Accordingly, the proper rule having the proper non-uniform scale may be used in the plotting device to plot the proper function for the particular substance whose concentration is to be measured.

In FIG. 2(d), a ruler 11''' is provided having blank scale portions 13. The scale portion 13 of the ruler 11''' is constructed with a material having a surface that can be marked by the operator to produce any desired scale depending on the desired substance whose concentration is to be measured.

In the above descriptions, a manual plotting device has been demonstrated. It would clearly be advantageous to provide an automatic recording apparatus having a response which could be varied for a different substance so that an operator merely sets some dials for changing the response of the automatic recording apparatus depending on the particular substance whose concentration is to be measured.

Figure 3:
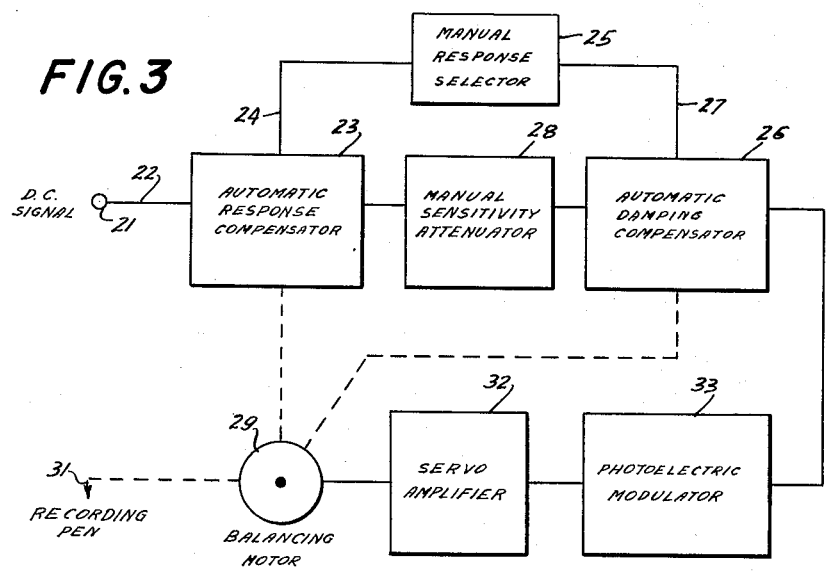
FIG. 3 is a block diagram of a recording apparatus incorporating the principles of the present invention.

Referring now to FIG. 3, a block diagram of such an apparatus is indicated. The output signal from the photometer is applied to the input terminals 21 and applied from there on a connection 22 to the automatic response compensator 23. Connected to the automatic response compensator 23 by means of a connection 24 is a manual response selector 25 which is also connected to an automatic damping compensator 26 by a connection 27.

Arranged between the automatic response compensator 23 and the automatic damping compensator 26 is a manual sensitivity attenuator 28. The automatic response compensator 23 and the automatic damping compensator 26 are mechanically connected together and to a balancing motor 29. The mechanical connections are indicated by the dotted line in FIG. 3. Also mechanically connected to the balancing motor is a recording pen 31 which is used for recording the graph on the chart paper.

The balancing motor 29 is driven by the output of a servo amplifier 32 which is connected to a modulator 33. The modulator 33 in turn is connected to the automatic damping compensator 26.

Figure 4:
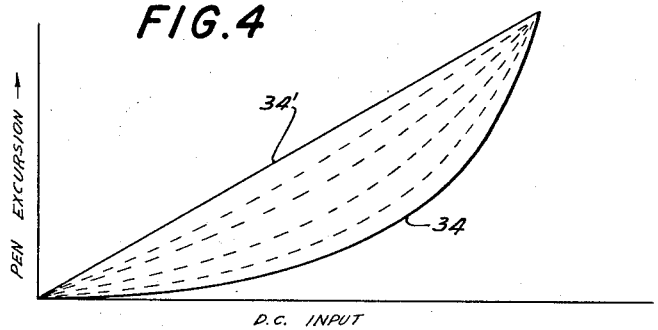
FIG. 4 is a graphical representation of the different responses that can be obtained using the recorder constructed in accordance with the principles of FIG. 3.

Referring to FIG. 4, a graphical representation is shown indicating the relationship between the signal and the recording pen excursion. The input signal is arranged along the X-axis and the pen excursion is arranged along the Y axis of the graph of FIG. 4. The envelope 34 is shown which includes the various relationships obtainable by the arrangement shown in FIG. 3. It is clear that at the uppermost portion of the envelope 34, along the line 34', the relationship between signal and excursion is a linear relationship which is provided by the conventional automatic recorder such as the self-balancing potentiometer type. As a response moves downwardly towards the line 34, it is clear that the relationship between the signal and the excursion movement of the pen departs from the linear relationship by a greater amount.

The operation of the apparatus having the block diagram shown in FIG. 3 will be described in greater detail with respect to FIG. 5. However, in FIG. 3 it is apparent that the direct current signal from the photometer is not applied directly to the self-balancing potentiometer which includes the main slide wire but rather, the signal is applied indirectly through a modifying input circuit including three distinct sections.

The first section of this input circuit includes the automatic response compensator 23 which progressively attenuates the input signal as the main potentiometer moves to balance increasing input signal values. The compensation provided by the automatic response compensator thereby results in a quasi-logarithmic response function.

The second section of the input circuit which is used to modify the operation of the self-balancing potentiometer, is the sensitivity attenuator 28 which is a voltage divider that has manually adjustable coarse and fine controls. This attenuator can be used for applying any desired portion of the compensated input voltage to the main potentiometer or slide wire either for the purpose of matching the sensitivity of the recorder to that of the measuring instrument to which it is connected or for otherwise setting the recording pen to a desired base line for a desired maximum input.

Finally, the third section of the input circuit for modifying the input to the main slide wire is the automatic damping compensator 26. This circuit provides for automatic damping, as its name implies so that the pen will be properly damped regardless of its exact distance from the base line.

In FIG. 3, after the input signal is modified by the input circuit including the members 23, 28 and 26, it is balanced in the main potentiometer with respect to a portion of the reference voltage which is derived from a battery in the recorder in a manner similar to the conventional potentiometer recorder. The self-balancing of the movable tap of the potentiometer is accomplished by a converter, servo-loop amplifier 32 and a reversible balancing motor 29 as will be described in further detail with respect to FIG. 5.

It is therefore clear that with the apparatus of FIG. 3, the different response curves whose envelope is shown in FIG. 4 can be obtained by varying the different settings of the input circuit 23, 28 and 26 to provide the desired change in the response of the recorder in accordance with the function of concentration versus light value of the type of substance being measured.

Referring now to FIG. 5, the various circuit elements of the recording instrument will be detailed.

In FIG. 5, the direct current signal from the photometer is applied to the input terminal 21. This direct current input signal is proportional to the radiation received by the photometer from the substance separated on the filter paper. However, as has already been indicated hereinabove, this radiation transmitted from the substance is not proportional to the concentration of the substance. It is a function of the recorder to change the amplitude of this input signal by an amount which changes the response of the recorder so that the signal recorded on the chart paper will be proportional to the actual concentration of the substance.

This signal is applied from the terminal 21 to the conductor 22 to the movable arm 36 of the switch 37 of the response selector 25. The switch 37 has a plurality of fixed contacts each of which is respectively connected to a different portion of a tapped resistor 38. In FIG. 5, the movable arm 36 is connected to the last position of the switch 37 so that the entire resistor 38 is bypassed. Accordingly, the signal is applied through the resistor 39 to the upper end 41 of the auxiliary slide wire 42 which is part of the automatic response compensator 23. The movable tap 43 of the slide wire 42 is mechanically connected, as indicated by the dotted line 44, to the balancing motor 29.

It is therefore apparent that the movable tap 43 of the auxiliary slide wire 42 is moved by the balancing motor 29 in the same manner as the movable tap 82 of the main slide wire 80 is moved. Accordingly, by setting the manual response selector switch 37 to a desired fixed contact, the input signal from the terminal 21 may be modified in a selected manner and this modification of the response of the recorder will be provided over the entire range of the excursion of the recording pen since the movable tap 43 will be moved to change the resistance of the auxiliary slide wire 42 as the excursion of the pen changes.

The input signal is also applied by the conductor 22 to the potentiometer 46 of the manual sensitivity attenuator 28. From the movable tap of the potentiometer 46 the signal is further transmitted by the conductor 47 to the movable member 48 of a switch 49. The switch 49 is arranged in the automatic damping compensator portion 26 of the circuit and includes a plurality of fixed contacts each of which is respectively connected to a different portion of a tapped resistor 51. It can be seen that the movable arm 48 of the switch 49 is mechanically coupled to the movable arm 36 of the switch 37.

The signal from the conductor 47 is also applied to the one side of the potentiometer 52 of the automatic damping compensator having the movable tap 53. The movable tap 53 of the potentiometer 52 is mechanically coupled to the tap 82 of the main slide wire 80 as well as to the tap 43 of the auxiliary slide wire 42 and is accordingly moved by the balancing motor 29 in the same manner as the movable tap of the auxiliary slide wire.

The modified signal is applied from the automatic damping compensator on a conductor 54 through a manual damping variable resistor 56 to the control electrode of an amplifier tube 57.

Also applied to the control electrode of the tube 57 by means of a conductor 58, is the output of the photoelectric modulator 33. The modulator 33 includes a photo-resistive cell 59 and a neon lamp 61. The lamp 61 is connected to the alternating current supply of the unit by means of a conductor 62 which is connected to the secondary winding of the transformer 63. Since the transformer 63 is connected to the alternating current supply for the recorder, the neon lamp 61 will flash on and off at the frequency of the alternating current supply. If this is 60 cycles, for example, the lamp will flash on and off 120 times a second.

Therefore, as long as there is a voltage across the photocell 59, that is as long as there is an unbalance across the photocell, the photocell 59 will produce a series of impulses occurring at the frequency of the flashing of the neon lamp 61. These impulses being applied to the control electrode of the tube 57 by means of the conductor 58, will convert the direct current unbalance voltage coming from the damping circuit into an alternating current unbalance signal. The alternating current unbalance signal is amplified in the tube 57 and applied by means of a conductor 64 to the control electrode of a second amplifier tube 66.

The amplified output signal from the tube 66 is applied by means of the conductors 67, 72 and 73 to the control electrode of the tube 71. The further amplified signal from the tube 71 is applied on the conductor 74 to the control electrode of the tube 76. The output of the tube 76 is applied to the control winding 77 of the balance motor 29.

The split-phase motor 29 also has a second winding 78 to which is applied the alternating current line voltage. The balance motor 29 will rotate in one direction or the other since the phase relationship of the amplified alternating current unbalance signal is reversed when the direct current unbalance voltage changes from positive to negative. The direction in which the motor 29 will rotate will depend upon whether the voltage on the slider 82 of the main slide wire 80 is larger or smaller than the voltage produced by the reference battery 81. That is, the main slide wire 80 has a movable tap 82 which is mechanically connected to the balance motor 29. This slide wire 80 is connected in parallel with the reference battery 81.

The balance motor 29 therefore receives two different voltages on the windings thereof. One of the voltages is applied to the winding 78 and consists of the substantially constant alternating current voltage derived from the supply lines. The control voltage is applied to the control winding 77. This control voltage bears a phase relationship to the alternating current unbalance voltage developed across the photocell 59. Accordingly, the balance motor 29 responds to these two different applied voltages by moving the slider 82 of the main slide wire 80 towards a balance point wherein the applied voltage will be balanced against a portion of the reference voltage of the battery 81. As the slider 82 is varied it is clear that the slider 53 of the automatic damping compensator potentiometer 52 and the slider 43 of the automatic response compensator potentiometer 42 is varied at the same time. In addition, the recording pen 31 is moved by the balance motor 29 as the other sliders above listed are moved. The recorder thereby records on the moving chart paper a continuous curve, each point of which corresponds to a respective point of a substance separated by migration on the filter paper. As will be explained hereinafter, the filter paper having the substances being analyzed is arranged to move past the densitometer used for scanning the filter paper.

It can therefore be seen that a particular response for the recording unit can be selected by properly positioning the manual response selector 25 to provide the desired response. The auxiliary slide wire 42 maintains this response throughout the entire recording range of the apparatus. Similarly, the setting of the automatic damping compensator switch 49 will ensure proper damping compensation throughout the entire excursion of the pen 31.

Another feature of the circuit shown in FIG. 5 is the pen vibrator circuit shown in the upper right hand corner thereof. This pen vibrator circuit includes an oscillator having a neon lamp 86 and a capacitor 87 arranged in parallel to oscillate at a preselected frequency. The particular frequency can be determined by the settings of the variable resistors 88 and 89 which are respectively the fine and coarse frequency control. In parallel with the abovementioned resistors and oscillator circuit is a constant voltage tube 91.

This pen vibrator circuit provides an oscillatory signal on the output conductor 92, which signal is applied to the control electrode of an amplifier tube 93. The amplified output from the tube 93 is taken from the anode thereof and applied on conductor 74 to the control electrode of the servo-amplifier 76.

Therefore the oscillatory voltage produced by the pen vibrator circuit is superimposed on the control voltages. The purpose of this circuit is to provide a very small amplitude movement on the part of the pen to provide proper faithfulness of the graphic representation of the very slow or fast changes of the voltage applied to the input circuit. This very small amplitude oscillatory movement eliminates any sluggishness due to the mechanical friction in the balance motor 29 or the various gear trains between the balance motor and the recording pen. This small oscillatory movement is transmitted to the very tip of the writing pen to effectively eliminate all possible friction in the writing apparatus.

The special damping compensator circuit 26 effectively eliminates any overshooting or hunting of the pen in all positions of the pen, which overshooting or hunting may be due to underdamping. It also eliminates dead zones or lagging due to overdamping. The ordinary damping resistance cannot cope as effectively with the damping problem since the response of the recorder deviates very considerably from a linear response. A constant damping resistance would not be adequate to ensure proper "dead-beat" positioning of the pen at all points of the scale thereof. Since in the present arrangement the automatic damping compensator 26 includes the potentiometer 52 which has a slider 53, to the balance motor, it is possible to change the damping resistance introduced into the circuit for each different position of the recording pen as the pen moves from zero indication to maximum indication. It should also be noted that the automatic damping compensator 26 is coupled to the manual response selector 25 so that as the response of the instrument is changed, the automatic damping compensation is also automatically changed the desired amount.

Therefore, with the above circuit, the response of the recording apparatus may be selected so that the actual recorded values will be proportional to the concentrations of the substances whose density is being measured even though the input signal applied to the input terminal 21 is not directly proportional to such concentration.

There are different resistance and impedance arrangements which can be used to provide a proper range of response changing characteristics for the main slide wire 80 of the recording apparatus. One such arrangement is shown in FIG. 6(a) wherein it can be seen that the movable slider 43 of the auxiliary slide wire 42 is mechanically and electrically coupled to the slider 82 of the main slide wire 80. It is apparent that the slide wires 42 and 80 may be made linear or non-linear as desired when the apparatus is put together so that the proper response range can be obtained.

Referring to FIG. 6(b), an arrangement is shown wherein the main slide wire 80 having the tap 92 is electrically connected to the sliders 43 and 43' of respective auxiliary potentiometers 42 and 42'. In this arrangement, the sliders 43 and 43' are mechanically coupled to each other and the potentiometers 42 and 42' are connected in circuit with the ends of the main slide wire 80 in such manner that when the resistance of the potentiometer 42 increases, the resistance of potentiometer 42' decreases and vice versa. This arrangement of FIG. 6(b) can provide a a greater non-linear response than the arrangement of FIG. 6(a).

In FIG. 6(c) two potentiometers 110 and 111 are used with the respective end terminals thereof connected together. The potentiometer 110 can be the main slide wire or potentiometer across terminals of which is connected the reference battery 112. The potentiometer 110 has a slider 113 which is electrically and mechanically connected to the slider 114 of the potentiometer 111.

In the arrangement of FIG. 6(c), one of the potentiometers may have al inear winding thereon so that its resistance increases linearly from one end thereof to the other while the other potentiometer may have a non-linear response and might be substantially logarithmic.

Referring to FIG. 6(d), a graphical representation of a response with the arrangement of FIG. 6(c) is shown. The response of the linear potentiometer is indicated by the curve 116 while the response of the logarithmic potentiometer is indicated by the curve 117. With the arrangement shown in FIG. 6(c), a response which is intermediate these two limiting responses is shown by the curve 118.

Referring now to FIG. 7(a), another arrangement is shown wherein three potentiometers 119, 121 and 122 are provided. The slider 123 of the potentiometer 119 is mechanically coupled to the slider 124 of the potentiometer 121. One end terminal of the potentiometer 122 is connected to the slider 123 while the other end terminal thereof is connected to the slider 124. The slider of the potentiometer 122 is directly connected to the input terminal 21 of the recorder.

In FIG. 7(b) is illustrated the response obtainable with the arrangement of FIG. 7(a). It is apparent that an entire family of curves is obtainable ranging from the linear response curve 126 to the logarithmic response curve 127. Any one of the intermediate curves can be chosen by proper variation of the potentiometer 122.

FIG. 8(a) is an arrangement for varying the obtainable response of the recorder indicated in FIG. 5. In this arrangement, a potentiometer 127 is shown connected across across a reference battery 128 and having a slider 129 mechanically coupled to the slider 131 of the potentiometer 132. The slider 129 is electrically connected to the input terminal 21 and to the slider 133 of a variable resistor 134, while one end of the resistor 134 is connected to one end of the potentiometer 132. With this arrangement, non-linear, quasi-logarithmic responses can be obtained merely by using two ordinary linear potentiometers. The variation of the slider 133 of the resistor 134 produces the desired variation of the response of the recorder either bringing it closer to a linear response or farther away therefrom. The arrangement as shown in FIG. 8(a) has a response which can be characterized by the equation:

$$\frac{r-ir}{r+i} = e$$

where $(e)$ is the ratio of the pen excursion $e_1$ to the full pen excursion $e_2$; $(i)$ is the ratio of the input signal $i_1$ to the input signal $i_2$ which is required for full pen excursion; and $(r)$ is the ratio of the resistance $R_1$ to which the resistor 134 is adjusted to the resistance $R_2$ of the potentiometer 132.

In FIG. 8(b), the graphical representation of the response functions produced with the arrangement of FIG. 8(a) is shown. In this family of curves, the changing parameter is $(r)$ and the lowermost curve 136 corresponds to the ratio $r_{min}$ and the uppermost curve 137 of FIG. 8(b) corresponds to the position where $r$ equals infinity. It should be noted that all the curves shown in FIG. 8(b) are semi-logarithmic in that they approximate logarithmic curves in that part of each curve which is in proximity of the point 138 representing full pen excursion.

Since the main slide wire of the recorder has a response which is no longer linear due to the various circuit arrangements shown in FIGS. 5–8, it is apparent that no fixed amount of damping resistance can be provided by circuit components which remain fixed during the entire excursion of the pen form its minimum or zero position to its maximum position. This is true since when a non-linear response is provided in an instrument of this type the ratio of the increment of the pen excursion to the corresponding increment of the signal is different at different pen positions. It is therefore apparent that the sensitivity of the loop of the servo-mechanism which moves the pen position would vary from point to point of the pen position. As a result, if the damping is adjusted to be correct for one particular point of the pen excursion there is a possibility of a dead zone or hunting due to overdamping or underdamping at other points to which the pen moves.

As has been explained with respect to FIG. 5, this difficulty is avoided by providing automatic compensation.

Referring now to FIG. 9(a), another arrangement for providing such automatic compensation is illustrated. In FIG. 9(a), the main potentiometer 139 is shown connected across the reference battery 141 and a second potentiometer 142 is shown connected in parallel with the potentiometer 139. The variable resistor 143 has its entire resistance connected between respective sliders of the potentiometers 139 and 142. This arrangement is substantially equivalent to the arrangement shown in FIG. 7(a). However, connected to the tap 144 of the resistor 143 is the slider 146 of an additional variable resistor 147. The slider 146 is mechanically coupled to the balance motor 29 as are the sliders of the potentiometers 139 and 142. In this manner, since the resistance of the variable resistor 147 varies with the pen position, the correct amount of the resistance for damping the circuit can be introduced into the circuit or eliminated from the circuit as the pen moves from its minimum to its maximum excursion position and vice versa. The variation of the resistor 147 may be a linear or a non-linear variation depending upon the particular need.

Referring now to FIG. 9(b), an additional damping circuit arrangement is shown. In this figure, the main potentiometer 148 has a slider 149 which is mechanically connected to the slider 151 of a second potentiometer 152. The slider 149 is also electrically connected to the movable member 153 of a switch 154 having a plurality of fixed contacts each of which is respectively connected to a different portion of a tapped resistor 156.

The movable member 153 is mechanically coupled to the movable member 157 of a second switch 158 having fixed contacts respectively connected to the taps of a tapped resistor 159. Also connected in circuit between the movable members 153 and 157 are the end points of variable resistor 161, a slider 162 thereof which is mechanically coupled to the balance motor with the sliders 149 and 151.

This arrangement is similar to the arrangement shown in FIG. 5 wherein automatic damping of the pen moving mechanism is provided regardless of the particular non-linear response chosen by the settings of the manual response selector 154. In this manner uniformly smooth action of the pen can be achieved through the entire range of the pen excursion in all settings of the controls which determine the response without requiring the operator of the recording instrument to make separate adjustments of the damping resistors each time that the response is changed.

Referring now to FIG. 10, a diagrammatic representation of a recording apparatus constructed in accordance with the present invention is shown arranged adjacent a conventional densitometer. The recording apparatus is mounted within a housing 210. On the upper surface of the housing 210 is arranged a chart paper 211 which moves in the direction indicated by the arrow 212 across the upper surface of the recording apparatus. The chart paper 211 is provided with a plurality of perforations 213 at opposite edges of the paper, which perforations cooperate with a respective sprocket wheel 214 for movement of the paper in the direction of the arrow 212.

Arranged above the upper surface of the chart paper 211 is the recording pen 216 which engages the chart paper. Then pen 216 can be moved back and forth in the direction of the arrows 217 which directions are transverse to the direction of movement of the chart paper 211.

The movements of the pen are produced by the balance motor 29 as described with respect to FIG. 5. Various knobs 218, 219 and 221 are shown mounted on the upper surface of the housing 210. These knobs respectively connect to the different sliders of the response and damping mechanisms as has already been described hereinabove.

The rear wall portion of the housing 210 is provided with a channel 222 which cooperates with the light source 223 of a densitometer 224.

In the illustrated embodiment, the light source produces a beam of light which is directed upwardly through the chart paper 211. For this embodiment a transparent or translucent chart paper can be provided. Taped to the upper face of the chart paper 211 is the filter paper 225 on which have been separated substances, the concentration of which is to be determined. It can be seen that the light source 223 is positioned opposite the pen 216 so that the pen records the light output of the densitometer on the chart paper at the point adjacent the actual point of the substance whose concentration is being measured, which substance is on the filter paper 225.

With this arrangement, the filter paper is always maintained in juxtaposition with the chart paper so that the corresponding points of the chart line up with the corresponding concentration of the substances on filter paper.

It is apparent that the maximum excursion of the pen 216 is arranged so that it will not reach the area of the chart paper on which the filter paper 225 has been fastened.

Accordingly with the apparatus shown in FIG. 10, the operator adjusts the proper knobs of the recorder to produce the preselected response determined empirically from the particular type of substance whose concentration is being measured and the particular type of process which has been used to separate out the substance on the filter paper. The densitometer then emits light beams through the substances on the filter paper, which light beams, transmitted through the substances, are detected by the densitometer detector and converted into electrical signals. These electrical signals are applied to the input terminals of the recorder and through the circuit shown in FIG. 5 to the balance motor which positions the pen 216 in response to the input signal. This response is not a linear response as has been determined hereinabove but is a response which can be adjusted by the various potentiometers shown in FIG. 5 and FIGS. 6–8. While the input signal applied to the recorder is not proportional to the concentration on the substance, the recorded signal is, in accordance with the present invention.

Referring now to FIG. 11, another arrangement of the filter paper with respect to the chart paper is shown. In this arrangement, the filter paper 225 is attached to an edge portion of the chart paper 211 so that the chart paper need not be transparent or translucent and the entire width of the chart paper 211 can be utilized. Again in this arrangement the recorded graph is adjacent to that point of the substance on the filter paper to which it corresponds.

In FIG. 12, still an additional arrangement is shown. In this arrangement the chart paper 211 has an elongated opening 226 cut out therefrom and adapted to receive the filter paper 225 thereabove. The filter paper 225 is attached to the edge portions of the opening 226 so that the light beam from the densitometer may pass through the substances on the filter paper to produce the electrical signals from the densitometer which are applied to the recording apparatus.

It is clear that the densitometer and the filter paper cooperating therewith may be arranged in different manners without departing from the spirit and scope of the present invention. For example, the densitometer can be arranged so that the light used for producing the electrical signals is reflected from the substances on the filter paper rather than transmitted therethrough. Also, the light beams from the densitometer may be projected downwardly from above the filter paper rather than upwardly from beneath the filter paper as illustrated.

The main advantage of having the filter paper and the chart paper connected to each other is that it permits the person reviewing the chart to visually see the substance corresponding to particular points along the chart. If the filter paper and the chart paper were driven independently, there is always the possibility that some mismatching between the independent drive mechanisms will make it impossible to determine what portions of the chart actually correspond to what portions of the substances on the filter paper.

It is also apparent that the arrangement shown in FIG. 10 can be used in conjunction with a conventional densitometer without rearranging the elements of the conventional densitometer in any way. The filter paper on which the substances have been separated, can be moved across the path of the light beam of the densitometer in the usual manner without modifying the operation of the densitometer.

The principles of the present invention can also be applied to similar devices used in related arts. There are numerous situations wherein non-linear recorders are required to record a very wide range of values including several logarithmic cycles. Such an arrangement is required, for example, in photographic sensitometry wherein sensitometric strips are utilized. These strips are negatives which are obtained by means of sensitometers in such a manner that different portions of the negative are exposed for different periods of time.

Therefore, on the sensitometric strip, a plurality of graded densities are provided, ranging from a very light density at one end thereof to a very heavy density at the other end thereof. These strips are used to test the photographic developing or printing process conditions or chemicals. For this purpose, a manually operated densitometer is used and the density values obtained therefrom are manually plotted by an operator to provide a curve of the density versus the logarithm of the exposure of the strip.

With the present invention, it is possible to plot such a curve automatically even though a very wide range of densities is provided. In FIG. 13, an arrangement is shown for carrying out such a wide range of plotting functions. The main slide wire 231 having a tap 235, is connected across the terminals of a battery 232.

Electrically connected to the tap 235 is one terminal of each of the variable resistors 233, 237 and 241, respectively. The variable tap of the resistor 233 is connected to one side of the potentiometer 234. The potentiometer 234, in turn, has a tap 236 connected to one side of a potentiometer 238, the other side of which is connected to the movable tap 237. The tap 239 of the potentiometer 238 is connected to one side of a potentiometer 242 having the other side thereof connected to the movable tap of the resistor 241. Finally, the potentiometer 242 has a movable tap 243 connected to one side of the main slide wire 231. The movable taps 235, 236, 239 and 243 of the potentiometers are all mechanically connected together so that they move in unison. These movable taps are, of course, simultaneously moved by the balancing motor of the balancing potentiometer recorder.

In operation, the voltage applied to the movable tap 235 of the main slide valve 231 is modified by the auxiliary potentiometers 234, 238 and 242. This modification counteracts the changes of the input voltage applied to the main slide wire. For example, a certain preselected input voltage is provided for obtaining a full scale excursion of the recording pen. When this input voltage is reduced, the excursion of the recording pen from its original zero deflection position will tend to be reduced. However, the auxiliary slide wires tend to increase the effect of the input voltage on the main slide wire 231 so that the pen excursion will not be reduced by an amount corresponding to the decrease of the input voltage but rather by a smaller amount.

Conversely, starting with a preselected pen excursion corresponding to a small input voltage, an increase of the input voltage applied to the main slide wire 231 would tend to produce a large pen excursion. However, the auxiliary slide wires minimize the effect of the increased input voltage when the taps thereof are moved. Accordingly, the increase of the pen excursion due to the increase of the input voltage is smaller than the increase which would have been produced in the absence of the auxiliary slide wires.

The auxiliary slide wires provide such a "counteracting" influence on the pen excursion by operating as voltage dividers. The resistances 233, 237 and 241 which are respectively connected in series with one of the potentiometers have an important function. The smaller the value of these variable series resistors, the greater will be the counteracting influence of the auxiliarly slide wires 234, 238 and 242.

In this manner it is possible to obtain a logarithmic or quasi-logarithmic potentiometer recorder even though each of the individual potentiometers has a linear response. If a linear auxiliary slide wire is added and a variable resistor having a resistance about $\frac{1}{10}$ of the auxiliary slide wire is connected in series therewith, then a quasi-logarithmic response is provided over the limited range of about 1 cycle corresponding to an input voltage range of 100:10. With additional slide wires, this recordable range of input voltage may be increased as desired.

It is also possible to provide wide range recorders using the above enumerated principles by having quasi-logarithmic or logarithmic main slide wires and quasi-logarithmic or logarithmic auxiliarly slide wires and various combinations of logarithmic and linear slide wires.

The principles of the present invention may also be applied to other types of apparatus. For example, in spectographic analyses, glass plates are obtained having a plurality of parallel lines thereon corresponding to the spectographic analysis of a particular substance or compound. The various lines arranged on the glass plate may be analyzed by the plotting of a curve using the recording apparatus incorporating the principles of the present invention.

It will be understood that each of the elements described above, or two or more together, may also find a useful application in other types of indicating apparatus differing from the types described above.

While the invention has been illustrated and described as embodied in recording apparatus for recording the concentrations of substances separated by migration on filter paper, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be secured by Letters Patent is:

1. In an automatic recording apparatus for electrical signals, in combination, input means for supplying an electrical input signal to be recorded; recording means having a substantially linear potentiometer member and a movable recording member; circuit means interconnecting said input means with said recording means for recording variations in said input signal by said movable recording member; adjustable response-varying means having a substantially linear variable impedance member mechanically coupled for substantially proportionate movement with said potentiometer member and electrically so connected to said potentiometer member as to be adapted to vary the response of the recording means to said input signal in such a manner that the movements of said movable recording member depend on said input signal in accordance with a quasi-logarithmic function; and adjusting means electrically connected to said response-varying means for adjusting the same so that the movements of said recording member depend on said input signal in accordance with different quasi-logarithmic functions.

2. In an automatic recording apparatus for electrical signals, in combination, substantially linear recording means having a movable member; input means for supplying an electrical input signal to said recording means; circuit means interconnecting said input means with said recording means for recording variations in said input signal by moving said movable member; substantially linear automatic response compensating variable control means electrically connected to said recording means and mechanically coupled to said movable member for substantially proportionate respective movement in a manner whereby said variable control means is varied by the movement of the said movable member for introducing in the circuit of said recording means a control voltage having a magnitude varying substantially linearly in accordance with the movement of the said movable member and so diminishing the effect of a change in magnitude of said input signal that the relation of the movement of said movable member to the variation of the magnitude of said input signal becomes quasi-logarithmic; and adjustable response selecting variable control means electrically connected to said response compensating variable control means for controlling the extent of deviation from linear relation between the movements of said movable member and the corresponding input signal.

3. In an automatic recording apparatus for electrical signals, in combination, substantially linear recording means having a movable member; input means for supplying an electrical input signal to said recording means; circuit means interconnecting said input means with said recording means for recording variations in said input signal by moving said movable member; substantially linear response compensating variable impedance means electrically connected to said recording means and mechanically coupled to said movable member for substantially proportionate respective movement in a manner whereby said variable impedance means is varied by the movement of the said movable member for introducing in the circuit of said recording means a control voltage having a magnitude varying substantially linearly in accordance with the movement of the said movable member and so diminishing the effect of a change in magnitude of said input signal that the relation of the movement of said movable member to the variation of the magnitude of said input signal becomes quasi-logarithmic; adjustable response selecting variable impedance means electrically connected to said input means and to said automatic response compensating variable voltage means for controlling the extent of deviation from linear relation between the movements of said movable member and the corresponding input signal; and automatic damping compensating means electrically connected in circuit between said response compensating variable impedance means and said recording means and mechanically coupled to said movable member in a manner whereby said damping compensating means is varied by the movement of the said movable member for providing a damping and gain control voltage having a magnitude varying in accordance with the movement of said movable member and varying in magnitude substantially in proportion to the ratio of incremental movement of the said movable member to incremental magnitude change in said input signal at any position of the said movable member.

4. In an automatic recording apparatus for electrical signals, in combination, recording means having a movable member; movement control means coupled to said movable member of said recording means; input means for supplying an electrical input signal to said movement control means; circuit means interconnecting said input means with said recording means for recording variations in said input signal by moving said movable member in a non-proportional relation to said input signal which is in quasi-logarithmic relation to the magnitude of the said input signal and which is substantially proportional to said input signal when the said input signal varies in a substantially reverse quasi-logarithmic manner; automatic response compensating variable impedance means electrically connected to said input means and mechanically coupled to said movable member in a manner whereby said variable impedance means is varied by movement of the said movable member for providing a substantially linear control voltage having a magnitude varying in accordance with the movement of the said movable member and diminishing the effect of a change in magnitude of said input signal; adjustable response selecting variable impedance means connected to said input means and to said response compensating variable impedance means for controlling the extent of deviation from linear relation between the movements of said movable member and the corresponding input signal; automatic damping compensating means electrically connected in circuit between said response compensating variable impedance means and said recording means and mechanically coupled to said movable member in a manner whereby said damping compensating means is varied by the movement of the said movable member for providing a damping and gain control voltage having a magnitude varying in accordance with the movement of said movable member and varying in magnitude substantially in proportion to the ratio of incremental movement of the said movable member to incremental magnitude change in said input signal at any position of the said movable member; main variable impedance means electrically connected in circuit between said response compensating variable impedance means and said recording means and mechanically coupled to said movable member in a manner whereby said main variable impedance means is varied by the movement of the said movable member for providing a substantially linear main control voltage having a magnitude varying in accordance with the movement of said movable member; oscillator means for providing an oscillatory auxiliary control signal; and means for supplying said auxiliary control signal to said movement control means.

5. In an automatic recording apparatus for electrical signals, in combination, recording means having a movable member; movement control means coupled to said movable member of said recording means; input means for supplying an electrical input signal to said movement control means; circuit means interconnecting said input means with said recording means for recording variations in said input signal by moving said movable member in a non-proportional relation to said input signal which is in quasi-logarithmic relation to the magnitude of the said input signal; automatic response compensating variable impedance means electrically connected to said input means and mechanically coupled to said movable member in a manner whereby said variable impedance means is varied by movement of the said movable member for providing a control voltage having a magnitude varying in accordance with the movement of the said movable member and diminishing the effect of a change in magnitude of said input signal; adjustable response selecting variable impedance means connected to said input means and to said response compensating variable voltage means for controlling the extent of deviation from linear relation between the movements of said movable member and the corresponding input signal; automatic damping compensating means electrically connected in circuit between said response compensating variable impedance means and said recording means and mechanically coupled to said movable member in a manner whereby said damping compensating means is varied by the movement of said movable member for providing a damping and gain control voltage having a magnitude varying in accordance with the movement of said movable member and varying in magnitude substantially in proportion to the ratio of incremental movement of the said movable member to incremental magnitude change in said input signal at any position of the said movable member; main variable impedance means electrically connected in circuit between said response compensating variable impedance means and said recording means and mechanically coupled to said movable member in a manner whereby said main variable impedance means is varied by the movement of said movable member for providing a main control voltage having a magnitude varying in accordance with the movement of said movable member; oscillator means for providing an oscillatory auxiliary control signal; and means for supplying said auxiliary control signal to said movement control means.

6. In an automatic recording apparatus for electrical signals, in combination;
input means for supplying an electrical input signal to be recorded;
recording means having self-balancing potentiometer means and a movable recording member;
adjustable response-varying means having variable resistance means mechanically coupled to said potentiometer means;
circuit means interconnecting said input means with said recording means and with said response-varying means and adapted to vary by feedback the response of the recording means to said input signal in such a manner that the movements of said movable recording member depend on said input signal in accordance with a quasi-logarithmic function; and
adjusting means having adjustable resistance means electrically connected to said circuit means for adjusting the same so that the movements of said recording member depend on said input signal in accordance with different quasi-logarithmic functions, one of said potentiometer and variable resistance means having a qusia-logarithmic character whereby the relation of movements of the said recording member to variations of the said input signal deviates from linear to an extent greater than the deviation of said quasi-logarithmic character from linearity.

7. In an automatic recording apparatus for electrical signals, in combination,
input means for supplying an electrical input signal to be recorded;
recording means having self-balancing potentiometer means and a movable recording member;
adjustable response-varying means having variable resistance means mechanically coupled to said potentiometer means;
circuit means interconnecting said input means with said recording means and with said response-varying means and adapted to vary the response of the recording means to said input signal by feedback in such a manner that the movements of said movable recording member depend on said input signal in accordance with a quasi-logarithmic function; and
adjusting means having adjustable resistance means electrically connected to said circuit means for adjusting the same so that the movements of said recording member depend on said input signal in accordance with different quasi-logarithmic functions, both said potentiometer and variable resistance means being of quasi-logarithmic character whereby the relation of movements of the said recording member to variations of said input signal deviates from linear to an extent considerably greater than caused by the deviations of said logarithmic characters from linearity.

8. In an automatic recording apparatus for electrical signals, in combination,
input means for supplying an electrical input signal to be recorded;
recording means having self-balancing potentiometer means and a movable recording member;
adjustable response-varying means having variable resistance means mechanically coupled to said potentiometer means;
circuit means interconnecting said input means with said recording means and with said response-varying means and adapted to vary the response of the recording means to said input signal by feedback in such a manner that the movements of said movable recording member depend on said input signal in accordance with a quasi-logarithmic function; and
adjusting means having adjustable resistance means electrically connected to said circuit means for adjusting the same so that the movements of said recording member depend on said input signal in accordance with different quasi-logarithmic functions, said variable resistance means comprising a plurality of potentiometer members electrically connected to each other and each having an adjustable response selector mechanically connected to the adjustable response selectors of the others, at least one of said plurality of potentiometer members being non-linear whereby the relation of movements of the said recording member to variations of said input signal deviates from linear to an extent greater than the deviation of said one of said potentiometer members from linearity.

9. In an automatic recording apparatus for electrical signals, in combination,
input means for supplying an electrical input signal to be recorded;
recording means having self-balancing potentiometer means and a movable recording member;
adjustable response-varying means having variable resistance means mechanically coupled to said potentiometer means;
circuit means interconnecting said input means with said recording means and with said response-varying means and adapted to vary the response of the recording means to said input signal by feedback in such a manner that the movements of said movable recording member depend on said input signal in accordance with a quasi-logarithmic function; and
adjusting means having adjustable resistance means electrically connected to said circuit means for adjusting the same so that the movements of said recording member depend on said input signal in accordance with different quasi-logarithmic functions, said first-mentioned and last-mentioned potentiometer means comprising a plurality of potentiometer members electrically connected to each other and each having an adjustable response selector mechanically connected to the adjustable response selectors of the others, more than one of said plurality of potentiometer members being non-linear whereby the relation of movements of the said recording member to variations of said input signal deviates from linear to an extent considerably greater than the continued effect of deviations of said non-linear potentiometer members from linearity.

10. In a self-balancing potentiometer recorder of the type including terminals for the input signal, an electrical reference source with which the input signal is compared, variable resistance means for comparing potentiometrically the input signal with the reference source, a movable recording member, a comparison circuit and automatic rebalancing means, in combination, a first substantially linear variable resistance;
a second substantially linear variable resistance, said first and second resistances being mechanically coupled to each other and to said recording member for substantially proportionate relative movement;
an adjustable resistance; and
circuit means interconnecting said terminals and said reference source and said first, second and adjustable resistances and said automatic rebalancing means in such a manner that the effect of any change in the magnitude of the input signal causing a change in said first resistance is diminished by the effect of the change of said second resistance being brought about by the movement of said second resistance with said first resistance due to said change in the magnitude of said input signal, resulting in a non-linear quasi-logarithmic relation of the movement of the recording member with respect to the change of magnitude of said input signal, said adjustable resistance being adapted to modify the magnitude of the effect of the change of said second resistance so that the extent of deviation of the response from linearity may be controlled.

11. In a self-balancing potentiometer recorder of the type including terminals for the input signal, an electrical reference source with which the input signal is compared, variable resistance means for comparing potentiometrically the input signal with the reference source, a movable recording member, a comparison circuit and automatic rebalancing means, in combination, a first variable resistance;
at least one additional variable resistance, said first and additional resistances being mechanically coupled to each other and to said recording member for substantially proportionate relative movement;
at least one adjustable resistance; and
circuit means interconnecting said terminals and said reference source and said first, additional and adjustable resistances and said automatic rebalancing means in such a manner that the effect of any change in the magnitude of the input signal causing a change in said first resistance is diminished by the effect of the change of said additional resistance being brought about by the movement of said additional resistance with said first resistance due to said change in the magnitude of said input signal, resulting in a relation of the movement of said recording member with respect to the change of magnitude of said input signal which is distorted from a linear relation considerably more than the deviation from linearity of either of said first and additional resistances, said adjustable resistance being adapted to modify the extent of the effect of the variation of at least said one additional resistance so that the extent of the contribution to the distortion of the said one additional resistance may be controlled.

References Cited in the file of this patent

UNITED STATES PATENTS

| | | |
|---|---|---|
| 1,858,364 | Koenig | May 17, 1932 |
| 2,108,037 | Au | Feb. 15, 1938 |
| 2,184,104 | Smith | Dec. 19, 1939 |
| 2,464,708 | Moseley | Mar. 15, 1949 |
| 2,467,812 | Clapp | Apr. 19, 1949 |
| 2,656,498 | Goodwin | Oct. 20, 1953 |
| 2,661,260 | Salzman | Dec. 1, 1953 |
| 2,697,812 | Kammerer | Dec. 21, 1954 |
| 2,707,143 | Ingledue | Apr. 26, 1955 |
| 2,722,470 | Witt | Nov. 1, 1955 |
| 2,763,787 | Jacobs | Sept. 18, 1956 |